United States Patent [19]  [11] 3,972,587
Scheffer  [45] Aug. 3, 1976

[54] LIQUID CRYSTAL DISPLAY

[75] Inventor: Terry J. Scheffer, Wettingen, Switzerland

[73] Assignee: BBC Brown Boveri & Company Limited, Baden, Switzerland

[22] Filed: Nov. 13, 1974

[21] Appl. No.: 523,452

[30] Foreign Application Priority Data
Dec. 21, 1973 Switzerland .................... 18015/73

[52] U.S. Cl. .......................... 350/150; 350/160 LC
[51] Int. Cl.² .......................................... G02F 1/13
[58] Field of Search ................... 350/150, 160 LC

[56] References Cited
UNITED STATES PATENTS
3,731,986   5/1973   Fergason .................. 350/160 LC
3,784,280   1/1974   Bigelow .................... 350/160 LC Primary Examiner—Eli Lieberman
Attorney, Agent, or Firm—Oblon, Fisher, Spivak, McClelland & Maier

[57] ABSTRACT

An improved liquid crystal display apparatus is disclosed which is characterized by an especially bright and uniform readout surface. The display apparatus includes only a single polarizer placed between the light source and the liquid crystal cell, and the liquid crystal molecules are rotated through 45° about an axis normal to the surface of the liquid crystal cell.

14 Claims, 6 Drawing Figures

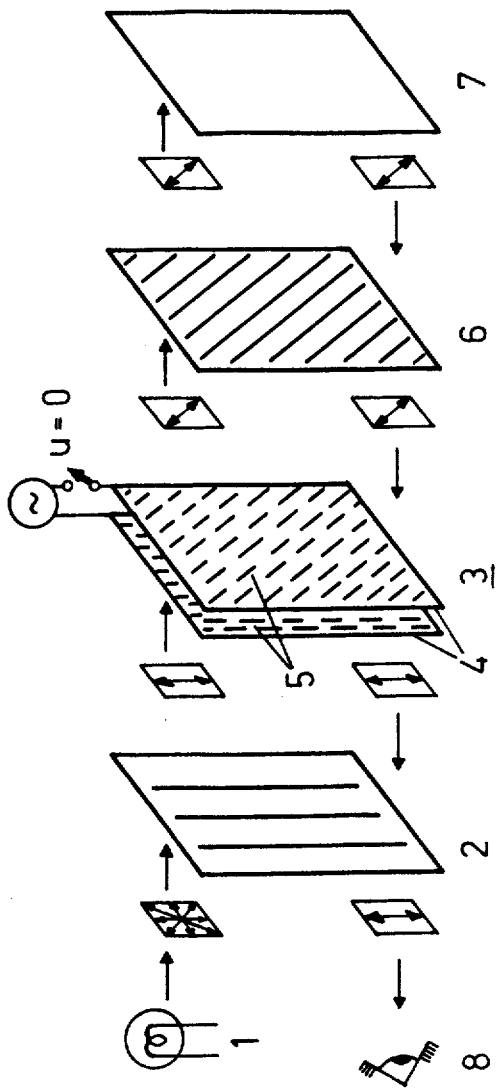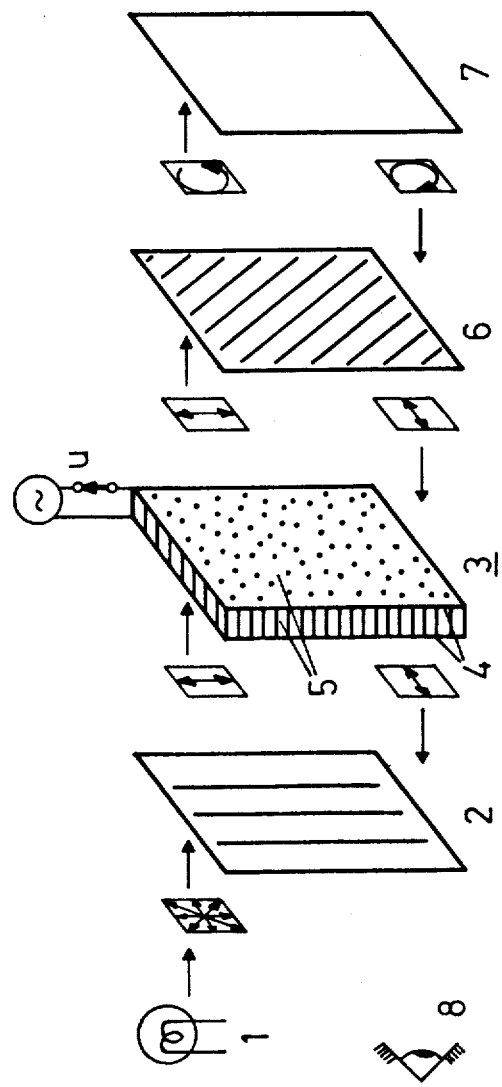

LIQUID CRYSTAL DISPLAY

BACKGROUND OF THE INVENTION

1. Field of the Invention

The present invention relates generally to an arrangement for controlling the transmission of light, and more particularly to a liquid crystal having electrode films thereon combined with a polarizer arrangement and a reflector.

2. Description of the Prior Art

Arrangements for controlling the transmission of light with the help of an electrode-coated liquid crystal cell in plate form placed between two polarizers and a reflector are known from DT-OS 2,158,563. In such devices it is preferable to use nematic liquid crystals, the molecules of which are disposed parallel to the electrode surfaces in a certain preferred direction. Between the two electrodes the molecules are so oriented that there is a continuous transition from the preferred direction in the boundry layer of one electrode to the preferred direction in that of the other, the molecules thus being arranged in helical fashion. In such known arrangements for controlling the transmission of light there was a 90° twist of the liquid crystal between the electrode surfaces. Furthermore, two polarizers were always required.

Such an arrangement has the disadvantage that the output brightness often is not sufficient, because the incident light must pass through polarizing layers four times, resulting in a considerable loss of intensity since polarizing layers are not optically ideal and they absorb a significant portion of the light passing through even when aligned with the polarization direction of the incident light. Furthermore uniformity in liquid crystal readouts is frequently unattainable. This is probably connected with the formation of domain structures in liquid crystals. For instance with a 90° twist in the crystal there can occur both right and left-hand twisted structures, which can therefore give rise to the formation of right- or left-hand twisted domains. At the boundary layers of such domains there are optical discontinuities which mar the appearance of the readout surface considerably by forming rings or stripes.

SUMMARY OF THE INVENTION

It is therefore one object of this invention to develop an arrangement for controlling light transmission which is distinguished by an especially bright and uniform readout surface.

Briefly, this and other objects and features of the invention are attained by having as the polarizer device only a single polarizer placed between the light source and the liquid crystal cell and rotating the liquid crystal through 45° about the axis normal to the electrode surfaces. Since there is now a single, instead of several, light-absorbing polarizers in the light path and the domain formation giving rise to discontinuities is prevented, particularly bright and uniform readout surfaces are obtained with the arrangement of the invention. A further advantage is apparent in the economical method of manufacture and the simple technical construction of the readout device.

If particularly high demands are made of the readout surface, then it is recommended that a quarter wavelength plate be placed between the liquid crystal cell and the reflector. Then the preferred direction of the electrode surface next to the quarter-wavelength plate and the direction of the optical axis of the quarter-wavelength plate can be turned about an axis normal to the plate so as to be either parallel or 45° apart. With no voltage on the electrodes the liquid crystal cell then rotates the polarization of the incident light through 45° so that it is parallel or at 45° to the optical axis of the quarter-wavelength plate. After reflection at the mirror the light again passes through the quarter-wavelength plate so that the direction of polarization of the light remains unchanged or is rotated through 90°, and thus with the preferred direction of the electrode next to the quarter-wavelength plate and the direction of the latter's optical axis parallel, the readout surface is bright, but with them 45° apart it is dark.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a shows the configuration and light path of the device of the invention adjusted for transmission; and, FIG. 1b shows the device of FIG. 1a adjusted to block transmission.

DESCRIPTION OF THE PREFERRED EMBODIMENTS

Figure 2:
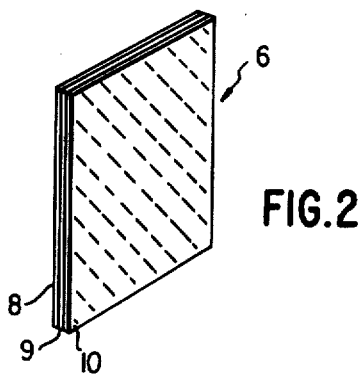
FIG. 2 shows the quarter-wavelength plate as a layered structure.

Referring now to the drawings, wherein like reference numerals designate identical or corresponding parts throughout the several views, and more particularly to FIGS. 1a and 1b, a light source is denoted by the reference numeral 1, while 2 denotes a linear polarizer. The numeral 3 designates a liquid crystal cell, which is represented in the drawing by only two transparent electrode films 4, with their preferred directions rotated by 45° with respect to one another, and a few representative nematic liquid crystal molecules 5. The letter U denotes a control voltage applied to the electrodes 4 which produces an electric field for alignment of the molecules in the liquid crystal cell 3. The numeral 6 denotes a quarter-wavelength plate, 7 a reflector and 8 an observer.

The unpolarized light of source 1 passes through the polarizer 2 so that only vertically polarized light reaches the liquid crystal cell 3. If, as is seen in FIG. 1a, there is no control voltage at the electrodes 4, the vertically polarized light is rotated through 45° by the liquid crystal molecules 5 and after passing through the cell 3 arrives at the quarter-wavelength plate, the optical axis of which is aligned with the new polarization direction of the light passing through it. The light remains unchanged by the quarter-wavelength plate 6 and is incident on mirror 7 with its polarization direction still at 45° to the vertical. At the mirror 7 the light is reflected and passes through the quarter-wavelength plate 6 to the liquid crystal cell 3, the nematic liquid crystal molecules of which rotate the polarization direction to the vertical again, so that the light arrives at the observer 8 with no significant absorption in the polarizer 2.

If now, as in FIG. 1b, a control voltage U is applied to the electrodes 4, U being about 7 v. for example, with tin dioxide film electrodes separated by a liquid crystal layer about 3–4 μ thick and being a sufficiently high potential to rotate the liquid crystal molecules 5 into the field direction, then the liquid crystal cell 3 does not affect the vertical polarization of the transmitted light. This polarization direction then makes a 45° angle with the optical axis of the quarter-wavelength plate 6, so that the light incident on the mirror 7 is no longer linearly polarized but is circularly polarized, right-circularly in FIG. 1b for example. Upon reflection from mirror 7 the polarization sense changes and the reflected, left-circularly polarized light is transformed in the quarter-wavelength plate 6 into horizontal linearly polarized light, which is absorbed in polarizer 2 after passage through the optically inactive liquid crystal cell 3 and thus does not reach the observer 8.

The quarter-wavelength plate 6 can be made, for example, from a stretched and therefore doubly refracting polyvinylalkohol (PVA) foil with an optical retardation of 140 ± 20 mμ, embedded between two thicker plastic sheets. The double refraction in such PVA-films is almost independent of the wavelength λ, and for this reason the quarter-wavelength plates made of them exhibit a retardation of λ/4 at a single discrete wavelength.

If the quarter-wavelength plate has its λ/4 retardation right around 560 mμ, i.e. at the wavelength of the human eye's maximum sensitivity, it is especially suited for use in a liquid crystal readout device. At the limits of the visible spectrum, about 400 mμ in the violet and about 700 mμ in the red, the retardations are respectively 0.35 λ and 0.2 λ. A combination of a 560 mμ quarter-wavelength plate with a linear polarizer and a mirror completely absorbs green light and transmits only a little red and violet light, which however is scarcely annoying since the eye is very insensitive in this spectral region. Thus, with complete alignment of the liquid crystal molecules 5 (e.g. with 7 v. in a cell of the dimensions given above) and with normally incident light, there results a dark-to deep dark-brown readout surface which presents a strong contrast to the bright white readout surface of the cell with no voltage applied.

Complete absorption of the reflected light in the linear polarizer is obtained by use of an achromatic quarter-wavelength plate 6. This means that the double refraction Λ n of the plate must be proportional to the wavelength μ. The mineral apophylite has this property [M. Francon et al. J. Opt. Soc. Am. P. 1553 (1965)]. A film of stretched cellulose nitrate also exhibits this behavior. In combination with polymers with wavelength-independent double refraction, an achromatic quarter-wavelength plate can be made by a film layering process (U.S. Pat. No. 2,441,049) and used in the arrangement of the invention. Also applicable are quarter-wavelength plates fabricated by a film layering technique using films of the same material with wavelength-independent double refraction [S. Panchratnam, Proc. Indian Acad. Sci. A41, p. 130 (1955)].

Another embodiment of the invention is obtained by rotating the quarter-wavelength plate 6 through 45° about the axis normal to it. If the optical axis of plate 6 is vertical or horizontal the complementary electro-optical effect is observed, i.e. with no control voltage U applied the readout element appears dark and with it applied, bright.

It is also possible to realize the arrangement of the invention for controlling the transmission of light without using the quarter-wavelength plate 6. In this case the twisted nematic liquid crystal itself acts as quarter-wavelength plate. To obtain an optical anisotropy in the liquid crystal, the voltage applied to electrodes 4 must be no greater than a fifth of that needed in the arrangement with the quarter-wavelength plate. Using a liquid crystal cell 3 in the presently described embodiment a dark purple readout surface results in the blocking phase with a control voltage U of about 1.4 v.

The arrangement of the invention leads itself particularly to fabrication by thin-film techniques. The film sequence on the reflector side of the arrangement can then be, for example, liquid crystal 5, electrode 4, quarter-wavelength plate 6 backing layer (not shown in the figures), reflector 7 or liquid crystal 5, electrode 4, quarter-wavelength plate 6, reflector 7, backing layer or liquid crystal 5, quarter-wave-length plate 6, electrode 4, reflector 7, backing layer. In the last-mentioned sequence the quarter-wavelength plate must have high enough electrical capacity (low film thickness and high dielectric constant) to permit a.c. voltage control of the liquid crystal 5 (capacitive voltage divider). In the two last-mentioned sequences it is possible to transfer to the reflector 7 the function of electrode 4 in addition, and thus to eliminate electrode 4.

FIG. 2 shows the quarter-wavelength plate 6 as a layered structure comprising elements 8, 9 and 10.

Figure 3:
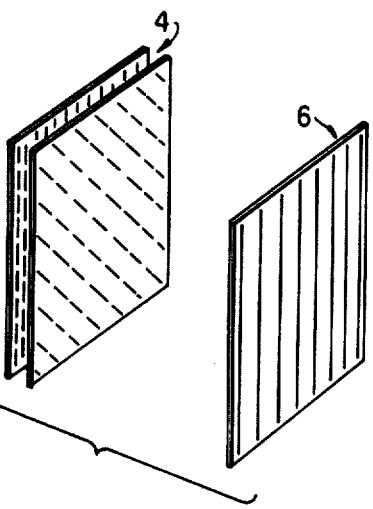
FIG. 3 shows the optical axis of the quarter-wavelength plate being rotated 45° with respect to the direction of the nearest electrode surface.

FIG. 3 shows the optical axis of the quarter-wavelength plate 6 being rotated 45° with respect to the direction of the nearest electrode surface 4. The rotation is about an axis normal to the quarter-wavelength plate 6.

Figure 4:
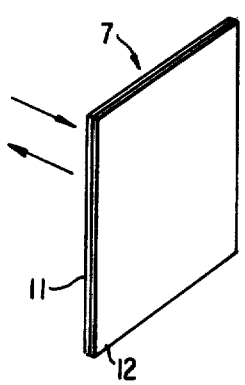
FIG. 4 shows the reflector comprised of a backing layer and a reflecting surface.

FIG. 4 shows the reflector 7 as including a backing layer 12 and a reflecting surface 11, the reflecting surface 11 being located in front of the backing layer 12.

Figure 5:
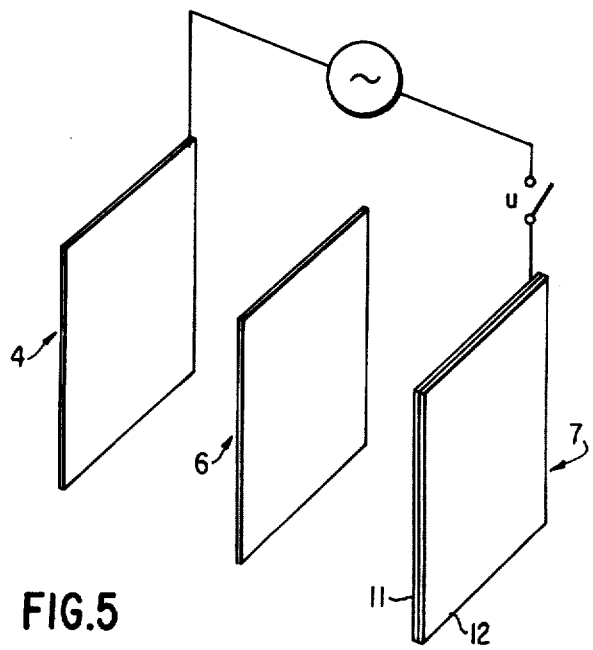
FIG. 5 shows the reflector being used as one of the electrodes.

FIG. 5 shows the reflector 7 serving as one of the electrodes to which a control voltage is applied.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A laminar liquid crystal cell apparatus for controlling the transmission of light from a light source comprising:
    a reflector;
    a liquid crystal cell having transparent electrodes on opposite surfaces thereof, said cell containing liquid crystal molecules helically twisted through 45° about an axis normal to said electrodes, said liquid crystal cell positioned between said light source and said reflector;
    a quarter-wavelength plate located between said liquid crystal cell and said reflector, and,
    only a single polarizer located between said light source and said liquid crystal cell.

2. An apparatus as in claim 1, further comprising:
    control means coupled to said electrodes for controlling optical characteristics of said liquid crystal cell.

3. An apparatus as in claim 1, wherein:

said quarter-wavelength plate is chromatic.

4. An apparatus as in claim 1, wherein:
said quarter-wavelength plate consists of a polyvinyl-alcohol film exhibiting a retardation of approximately 140 m$\mu$.

5. An apparatus as in claim 1, wherein:
said quarter-wavelength plate is achromatic.

6. An apparatus as in claim 5, wherein:
said quarter-wavelength plate is formed of apophylite.

7. An apparatus as in claim 5, wherein:
said quarter-wavelength plate comprises a stretched cellulose nitrate foil.

8. An apparatus as in claim 5, wherein:
said quarter-wavelength plate has a layered structure.

9. An apparatus as in claim 1, wherein:
the preferred direction of the electrode surface next to the quarter-wavelength plate and the optical axis of the latter are parallel.

10. An apparatus as in claim 1, wherein:
the preferred direction of the electrode surface next to the quarter-wavelength plate and the optical axis of the latter are rotated through 45° with respect to one another about an axis normal to the quarter-wavelength plate.

11. An apparatus as in claim 1, wherein:
said apparatus is fabricated predominantly of thin-film components.

12. An apparatus as in claim 11, wherein:
said reflector includes a backing layer and a reflecting surface, and said reflecting surface is located in front of said backing layer.

13. An apparatus as in claim 11, further comprising:
a quarter-wavelength plate located between said liquid crystal and said reflector.

14. An apparatus as in claim 13, wherein:
said reflector serves as one of said electrodes.

* * * * *